Nov. 18, 1952        F. RIEBER        2,618,764

SCANNING SYSTEM

Filed April 15, 1949

INVENTOR,
FRANK RIEBER, DECEASED.
LU GARDA RIEBER, EXECUTRIX.
BY
Lippincott & Smith

ATTORNEY.

Patented Nov. 18, 1952

2,618,764

UNITED STATES PATENT OFFICE 2,618,764

SCANNING SYSTEM

Frank Rieber, deceased, late of New York, N. Y., by Lu Garda Rieber, executrix, New York, N. Y., assignor to Geovision Incorporated, a corporation of New York Application April 15, 1949, Serial No. 87,819

20 Claims. (Cl. 315—24)

This invention relates to scanning systems, and particularly to systems adapted to trace, on a display surface, loci defining the possible positions of surfaces which, at successive instants of time, would reflect seismic waves originating from an explosion at a known location back to receptors or geophones located at other known locations.

Copending applications of the same inventor, Serial Numbers 53,954 and 65,883, entitled respectively "Method of and Apparatus for Displaying Geophysical Data" and "Geophysical Display Apparatus" disclose systems of geophysical exploration wherein there is projected on a display surface a representation to scale of a shot point and a plurality of geophones. A scanning member, such as a cathode ray beam, is swept over the display surface in expanding quasi-circular paths, each representative of the locus of all possible surfaces which would reflect the seismic wave originating at the shot point back to arrive at the geophone at an instant corresponding to that at which the locus is generated. These loci are modulated in accordance with the waves actually received at the respective geophones, and the actual position of any reflecting surface is defined by mutual reinforcement of the modulated loci.

If the shot point and the geophone were located at substantially the same point and the medium through which the waves were propagated were truly homogeneous, so that the waves traveled with constant velocity, the paths would be truly circular, or as nearly so as is possible in view of the requirement that the paths be constantly expanding so as to represent successive instants of time. This latter requirement converts the paths to very tight spirals whose pitch is negligible in comparison with the total diameter of the field being scanned. In practice, however, neither of the above conditions is met. The geophones are spaced from the shot point by various distances, which, even assuming homogeneity of the medium of propagation, means that the loci become elliptical instead of circular, each ellipse being described about the shot point and a specific geophone as its foci. As the ellipses expand to correspond with successive instants of time, they also change in shape, varying between the limits of a straight line (minor axis equals zero) and a circle (minor axis equals major axis). The variation in shape is a nonlinear function of time. The tight spiral paths of a scanning pattern representative of the loci must be distorted so that each turn approximates an ellipse instead of a circle.

Another departure from circularity in form of the loci is caused by the variation in velocity of the seismic waves in a non-homogeneous medium. Such a variation always occurs in some degree, since otherwise no reflections would take place; it is the discontinuities in the velocity of the waves that causes the reflections. Superimposed on such discontinuities, however, is a general increase of velocity with depth, caused by the increasing rigidity of the deeper layers which have been subjected for a longer period of geological time to compaction from the weight of the overlying layers, and by cementing of adjacent particles by materials carried therebetween and left by percolating water. To compensate for such changes in velocity, the rate of expansion of the loci must be varied, and again the variation is a nonlinear function of time. In this case, however, the variation is also a function of the angles with respect to the horizontal of the various points constituting the locus.

Under certain limited conditions the actual velocities of the waves in the strata to be explored may be known, and when this is the case, account may be taken of the actual discontinuities in the velocity curve. More generally, however, actual knowledge of the discrete values of velocity is not available, but a sufficiently accurate approximation can be achieved by assuming that the velocity of the waves varies with the depth to which they have been propagated before reflection in accordance with some smooth curve, which may be empirical but which is more likely to be based upon a reasonable assumption.

In the prior applications previously mentioned the assumption is made that the increase of velocity with depth is linear, which assumption leads to hyperbolic functions of time. It should be kept in mind throughout that the tracing of the loci is with respect to position and not directly with respect to velocity; i. e., that although the velocity is the factor which varies directly and, at times, discontinuously, the radii of the loci are proportional to the integral of the velocity at the instant under consideration, and that therefore the dimensions of these radii undergo no discontinuities; the rate at which the radius grows changes, but the radius itself does not suddenly "jump" in length.

This invention is directed specifically to tracing loci of the required forms, and is not concerned with either the means or method of modulating these loci in order to depict the geological mass under exploration. Among the objects of the invention are to provide a novel method of scanning a display surface; to provide a means of deflecting a scanning member across a display surface in patterns of non-uniform radii, varying in accordance with nonlinear functions of time; to provide a means of scanning a display surface in patterns the radii whereof vary in accordance with both time and with angle as measured from a preselected base line and origin; to provide a method and means of scansion of a display surface wherein the time function involved may be arbitrary or empirical; and, in general, to provide a scanning system for reproducing on a display surface loci of any desired form which may actually be met with in practice.

The commercial advent of television, facsimile, and the like has made the process of scanning widely familiar. Because of its convenience and essential simplicity the cathode ray tube is the best known of the devices for moving a scanning element rapidly across a display surface in two dimensions, but other scanning devices are well known and have had fairly extensive use over a long period of years. The type of scanning here especially considered is that in which the scanning element (whether it be a cathode ray beam, a beam of light, or a mechanical feeler) is moved independently in two directions at right angles to each other. The dimensions of motion may be considered as resolved into a "vertical" or "sine" component, and a "horizontal" or "cosine" component. It must be recognized that these dimensions are interchangeable and arbitrary, but it is convenient to use the terms and they will be so used herein, although they are not to be considered as limiting, as actually they indicate merely a quadrature relationship.

With any two-dimensional system of the type referred to, if a harmonic electrical quantity be generated, resolved into sine and cosine components, and the two components applied respectively in equal amplitudes to rectangularly disposed deflecting means, the scanning element will trace a circular path over the display surface. If the two components are modulated in accordance with a linear function of time the circular path will be converted into a spiral, the pitch of which depends upon the rate of increase of the linear function in comparison to the period of the harmonic function; if the change of amplitude per period be small in comparison with the total amplitude of the linear function the spirals approach very closely the circular form, whereas if the linear function reaches its full amplitude in a small fraction of the period the spirals approach radial form. In the latter case the modulating signals must be repeated for each radius. The area of the circle can obviously be covered in either manner, and intermediate forms are, of course, possible, but in the practical case the two extremes, which can be referred to respectively as "circular" and "radial" scanning are in general much to be preferred.

Broadly considered, the present invention comprises the method of and means for developing two quantities, at least one of which is electrical, one varying as a linear function of time and the other as a harmonic function, intermodulating these two quantities, and deriving (either before or after the modulation) sine and cosine components. At least one of the components is then remodulated as a nonlinear function of time, and in the preferred method of practicing the invention the nonlinear modulation product is applied to one of the deflecting means in algebraically additive relation to the linearly modulated product. The other deflecting means can be actuated either by the other linearly modulated phase component alone, or by said component in addition to a nonlinear modulation product. Under certain circumstances, and as a final step, one of the nonlinear modulation components may be modulated on one or the other of the linearly modulated components and one or both applied to the deflecting means.

In the apparatus aspect of the invention means may be provided arbitrarily to vary the nonlinear function of time.

The invention will be better understood from the following detailed description of one embodiment of the invention, taken in connection with the accompanying drawings, wherein.

Figure 1:
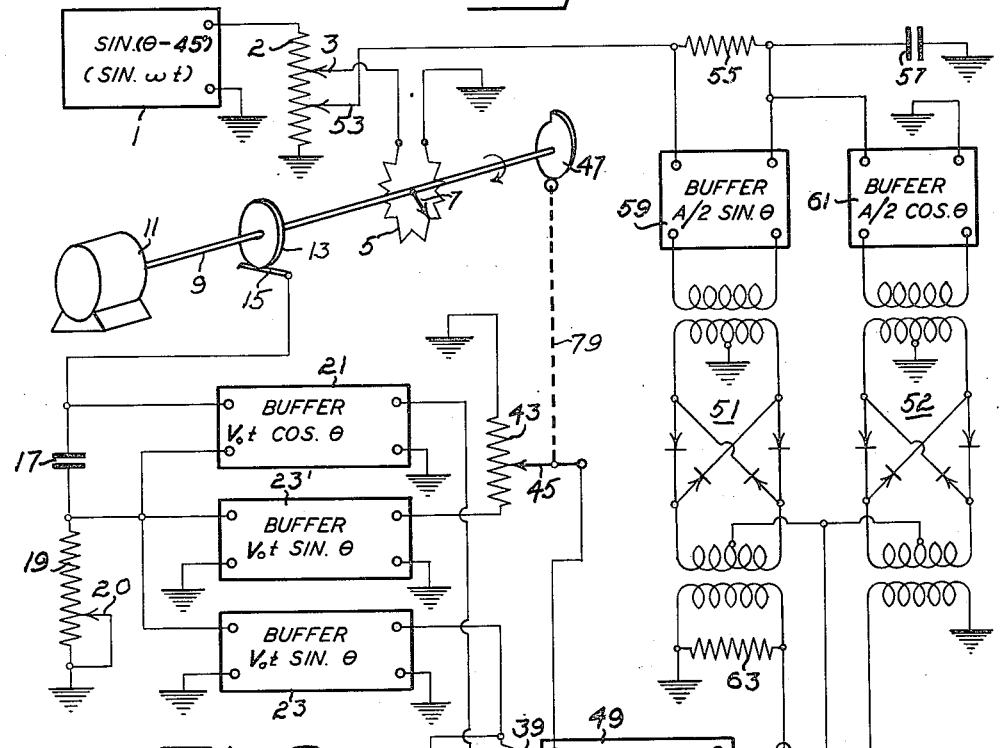
Fig. 1 is a schematic diagram of an embodiment of the device wherein the time functions, both linear and nonlinear, are mechanically generated.

Before describing the generation of the deflecting potentials (or currents, in case equivalent magnetic deflecting means are used) consideration should be given to the nature of the phenomena the apparatus is intended to depict and its limitations in depicting them. The seismic waves travel outwardly from the shot point in all directions simultaneously but with different velocities in the different directions. At some point in the earth they strike a reflecting interface between strata and a portion of their energy is reflected back to the geophone, which generates a signal. The significant signal from the first reflected wave front will persist for one half period of the earth vibration—something of the order of one one-hundredth second. The time of its arrival can be accurately measured; the information desired is distance and direction. The locus to be traced defines the position of all possible interfaces that could return a signal to a particular geophone at the particular instant such a signal is received.

Both shot point and geophone are normally located in the same stratum and the direct and reflected waves will therefore traverse the same beds of material at the same depths and will be subjected to the same variations of velocity, but in reverse order. Disregarding the separately applied elliptical correction, no material error is involved, therefore, in considering the locus as if it were a wave front, propagated from the mid-position between the shot point and the geophone as an origin, at one-half the actual velocity of the waves.

The scanning device cannot depict the locus simultaneously and as a whole, but must trace it point by point. The most convenient way of doing this is to sweep the scanning element over a curve whose radial distance from the origin is a function of time and of direction expressed as an angle, $\theta$, from the horizontal, in a time so short in comparison with the rate of growth of the radius and the period of the seismic wave that no material change can take place in either between the beginning and end of the sweep. This is not the only method, however; means can be provided for developing the modulating signal and applying it at the proper time as the scanning element is swept radially, as is described in the copending application Serial Number 82,432 filed March 19, 1941; Patent No. 2,557,691; issued June 19, 1951.

Scanning devices of the type here considered deflect the scanning element in accordance with rectangular coordinates. Expressed in such coordinates the equation of the virtual wave front of radius R (i. e., the imaginary wave front traveling at one-half velocity) is $R = R(\cos\theta + j\sin\theta)$. The velocity V of the wave front, assumed to vary with depth, is at this radius $\frac{1}{2}V_0[1+f(R\sin\theta)]$, and its horizontal and vertical components are respectively $V_h = \frac{1}{2}V_0[1+f(R\sin\theta)]\cos\theta$, and $V_v = \frac{1}{2}V_0[1+f(R\sin\theta)]j\sin\theta$.

The components of R are the integrals of these expressions with respect to the time, $t$, since the initiation of the wave, viz.:

$$R_h = \frac{1}{2}V_0\left[t + \int_0^t f(R\sin\theta)dt\right]\cos\theta$$

and $$R_v = \frac{1}{2}V_0\left[t + \int_0^t f(R\sin\theta)dt\right]j\sin\theta$$

As the depth $R\sin\theta$ to which the wave front has advanced at any point is a function of time, the velocity increment with depth, $f(R\sin\theta)$ can also be expressed as $f'(t\sin\theta)$. If the velocity increases linearly with depth this leads to an exponential law of increase for the radius. Another possible law of increase of velocity would be its increase as a square root function, i. e., $$V = \frac{1}{2}V_0\sqrt{1+KR\sin\theta}$$

whence $$V_h = \frac{1}{2}V_0\sqrt{1+KR\sin\theta}\cos\theta$$

and $$V_v = \frac{1}{2}V_0\sqrt{1+KR\sin\theta}\sin\theta$$

These expressions lead to $$R_h = \frac{1}{2}V_0(t+At^2\sin\theta)\cos\theta$$
$$R_v = \frac{1}{2}V_0(t+At^2\sin\theta)\sin\theta$$

where $$A = \frac{KV_0}{8}$$

In the initial description of the present device this law of increase will be assumed, showing later how any arbitrary function of time can be substituted.

The scanning device sweeps through the values of $\theta$ successively at a constant rate. At any instant, therefore, $\theta$ equals $\omega t$. For any single radius of the locus $\omega t$ is a constant, and does not as such enter into the integration of velocity which gives the magnitude of the radius; it is of directional significance only.

Referring now to Fig. 1, a master oscillator 1 develops an electrical potential of constant frequency and amplitude $\sin\omega t$, i. e., $\sin\theta$. This is fed to a potentiometer 2; the contact arm 3 of the potentiometer is set to a value proportional to $V_0$, and connects to a circular potentiometer 5, the contact arm 7 of which is driven by the shaft 9 of a constant speed motor 11. The speed of the motor is such that the shaft 9 makes one revolution in the scanning period corresponding to the four to six second interval, following the initiation of the seismic waves, during which reflections will generate a signal in the geophones that can be recognized above the noise level. The potential developed between the potentiometer arm 7 and ground is therefore proportional to $V_0 t\sin\theta$. This potential is taken off from a slip ring 13 by a brush 15, and is fed into some suitable form of resolver circuit, such as a condenser 17 in series with a resistor 19. This circuit should be of high impedance, so as to have no material loading effect upon the potentiometer 5, which would distort the wave form. The resistor 19 is shown as adjustable by a contact 20 so as to make the sine and cosine components, as derived from the resolver, equal.

The cosine component developed across condenser 17 is fed into a buffer amplifier 21. The sine component is fed into a pair of similar buffer amplifiers 23 and 23'. These amplifiers are provided merely to prevent loading effects upon the various circuits involved. They may be of any of several well known types; one suitable type is the cathode follower, which, if provided with a suitably high impedance output circuit, will deliver output voltages substantially equal to and in phase with their input supply.

Buffer amplifier 21 feeds a resistor 25 which connects to the horizontal deflecting plates 27 of a cathode ray tube 29. The latter can be of a conventional television type, comprising a cathode 31, one or more anodes 33, and a control electrode 35 for modulating the intensity of the cathode ray beam and the brilliance of the trace thereof on the fluorescent screen 37. It is frequently of advantage that this screen be of the persistent type, whereon the trace of the beam will remain visible for several seconds.

Buffer amplifier 23 feeds a resistor 39 which is connected to apply the sine component to the vertical deflecting plates 41 of the display tube.

Buffer amplifier 23' feeds a variable potentiometer 43, the contact arm 45 of which is mechanically driven by a cam 47 mounted on the motor shaft 9 and hence making one revolution within the scanning period. For diagrammatic purposes this is shown as an edge cam, although in practice, and as will be shown in detail later, it is preferable that it actually be of the face type. Its follower is so positioned as to take off from the output of buffer 23' a portion of the potential which increases linearly with time. The output of this amplifier is therefore proportional to $V_0 t^2 \sin\theta$. The pitch of the cam 47 is so adjusted as to traverse the entire potentiometer in each revolution of the shaft.

The potential taken off by the arm 45 is applied to another buffer amplifier 49, the output of which feeds a pair of ring modulators 51 and 52. These modulators are also fed with sine and cosine components derived from the master oscillator 1 through a contact arm 53 feeding a resolver circuit comprising, for example, a resistor 55 and condenser 57 which are preferably equal to resistor 19 and condenser 17 respectively. The arm 53 is set at a point on potentiometer 2 which will make the potentials taken from the resolver components proportional to the factor $$\frac{A}{2}$$

in the equations above given.

These potentials are fed to buffers 59 and 61 respectively, and these latter buffers therefore repeat into the modulators 51 and 52 potentials corresponding to $$\frac{A}{2}\sin\theta$$

and $$\frac{A}{2}\cos\theta$$

intermodulating these quantities with the $V_0 t^2 \sin\theta$ component from buffer amplifier 49.

Modulator 51 supplies its modulation product $$V_0 \frac{A}{2} t^2 \sin^2 \theta$$

to a resistor 63 in series with resistor 39 and forming therewith a summing network connecting to the vertical deflection plates 41. Modulator 52 similarly is connected to a resistor 65, connected in series with the resistor 25 to form a second summing network to feed the horizontal deflection plates 27. The sum of the voltages fed to the plates by buffer amplifier 23 and modulator 51, and by buffer amplifier 21 and modulator 52 are respectively proportional to the proper deflections as developed in the equations above given.

It will be recognized that the sine squared and sine times cosine functions are themselves harmonic quantities of double frequency, which are equal in amplitude but differ in phase by 90 electrical degrees. This being the case they can be generated by frequency division or other known methods, and then modulated by mechanical or electrical methods with the required time functions and added to the single-frequency quantities in the same way as though generated by modulation. The resultant radii of deflection, varying with angle and time, will be the same as in the system here described in detail. Furthermore, although the significance of the single and double frequency components is directional, the sine and cosine factors, as actually used in deflecting the scanning element, are actually different functions of time, and are applied to the deflecting system of the tube as such. The method here described therefore differs from that set forth in copending applications Serial Numbers 53,954 and 65,883 above referred to in that the system there used developed only a single harmonic frequency plus a direct component. In certain instances the result may be very nearly the same, but the method of the present application is believed to be more general, although not quite as accurate, since it does not take account of the curvature of the rays.

Figure 2:
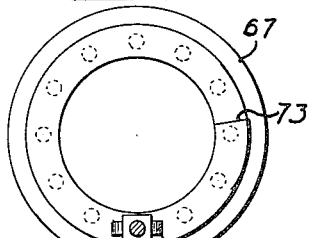
Fig. 2 is an elevational view of an adjustable cam for generating nonlinear functions of time.
Figure 3:
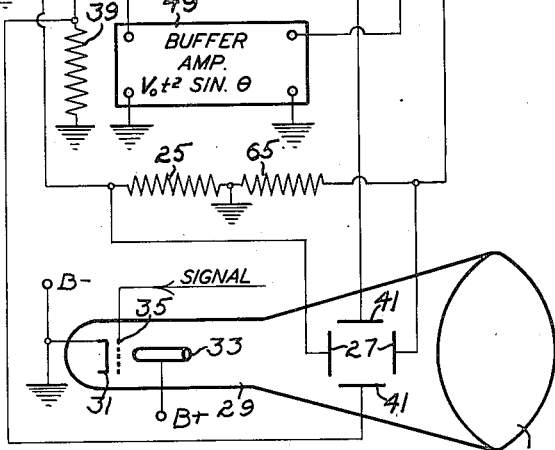
Fig. 3 is a side elevation of the cam shown in Fig. 2.
Figure 3:
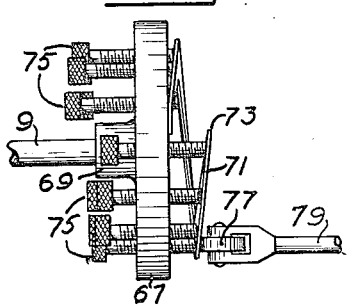

The assumption that the velocity of the seismic waves varies as a linear function of time, or as a linear function of the depth to which they have penetrated, or in any other arbitrary and regular manner is at worst a guess, at best an approximation. Starting with a guess, however, it is frequently possible by successive approximations to arrive at something very close to the actual state of affairs. In order to do this it is necessary that the function of time may be made adjustable, and this is possible by adjusting the cam 47. An adjustable cam of this character is illustrated in Figs. 2 and 3, wherein a face plate 67 provided with a hub 69 for mounting it upon the shaft 9, has mounted upon it an annular flat spring 71. The annulus is split at one point 73 and one of the resulting ends is rigidly secured to the base plate. Threaded through the base plate at uniform intervals behind the annular spring are a plurality of adjusting screws 75. These screws may each be advanced to a greater or less degree to force the spring outward from the face plate, thus providing a face cam of adjustable pitch. If the screws, taken in order, project through the face plate by uniformly increasing amounts the result will be a cam of uniform pitch, such as is described in the general explanation of the apparatus. By advancing the screws by other amounts the spring cam can be adjusted in accordance with any other law of increase of velocity with time, and this will be integrated by the apparatus previously described so as to give the proper deflection potentials. A suitable cam follower 77, working against the face of the spring cam operates a push rod 79.

It will be understood that the mechanical methods of generating the various functions of time employed in this system of scanning are illustrative merely. A copending application Serial Number 82,432, filed March 19, 1949, discloses electronic methods of generating both linear and non-linear time functions such as are required for the system here claimed. Other methods are known for the generation of such functions and can be substituted for the electro-mechanical methods here particularly described without departing from the spirit of this invention.

Prior scanning systems utilizing an intensity-modulated scanning element have normally striven to vary the deflecting quantities linearly with time. The exceptions to this rule have been the early television scanning systems wherein sinusoidal deflection was used, and here the effort was made to synchronize accurately two scanning elements moving in the same manner. It is believed that it is novel deliberately to modulate rectangular components of a scanning motion with non-linear functions of time to produce non-uniformly expanding paths, and particularly to so modulate the components that the paths expand at different rates in different directions from the origin.

In view of these facts it is desired to protect the invention involving this concept as broadly as is possible within the scope of the following claims.

What is claimed is:

1. A scanning system comprising means for generating a harmonic electrical quantity varying in amplitude as a linear function of time, means for resolving said quantity into sine and cosine components, means for developing a second harmonic quantity of the same frequency as said first mentioned quantity and varying in amplitude as a nonlinear function of time, means for intermodulating said second quantity with said sine and cosine components respectively, a cathode ray tube having a deflection system, and circuits for applying said modulated components to said deflection system to produce respectively rectangular components of deflection.

2. A scanning system in accordance with claim 1 including circuits for applying said unmodulated sine and cosine components to said deflection system in addition to their respective modulation products.

3. A scanning system in accordance with claim 1 including means for varying arbitrarily said nonlinear function of time.

4. A scanning system comprising a master oscillator, modulating means for varying the amplitude of the output of said oscillator as a linear function of time, means for remodulating at least a portion of said output as a function of time, a resolver fed by said first modulating means, to produce sine and cosine phase components thereof, a pair of modulators fed by said sine and cosine phase components respectively and by said remodulated output, a cathode ray tube, rectangular ray deflecting means associated with said cathode ray tube, and circuits connecting said pair of modulators respectively with the respective deflecting means.

5. A scanning system in accordance with claim 4 wherein said remodulated portion of said modulator output is in phase with said sine phase component.

6. A scanning system comprising means for generating a harmonic electrical quantity varying in amplitude as a linear function of time, a resolver connected to produce sine and cosine phase components of said quantity, means for modulating at least a portion of said quantity to produce a second harmonic quantity varying in amplitude nonlinearly with time, a modulator fed by said second quantity and one of said phase components to produce modulation products thereof, a cathode ray tube having associated therewith means for deflecting the cathode rays in two dimensions, connections for applying said sine and cosine components respectively to deflect said rays in said two dimensions, and additional connections for applying said modulation products to add algebraically to the deflection in one of said dimensions.

7. A scanning system comprising means for developing a linearly varying quantity and a harmonically varying quantity of widely different frequencies, at least one of said quantities being electrical, means for intermodulating said frequencies to produce an electrical modulation product, a resolver connected to produce sine and cosine components of said product, means for modulating at least one of said components in accordance with a nonlinear function of time, a cathode ray tube having associated therewith means for deflecting cathode rays in two dimensions, and circuits connecting to said deflecting means for applying said sine and cosine components respectively thereto, said modulated component being connected for application after modulation.

8. The method of scanning a surface with a scanning element movable in two dimensions over a surface which comprises deflecting said element in said dimensions by two harmonic forces in time quadrature, and varying the amplitude of each of said forces systematically at different rates to produce a distorted spiral pattern.

9. The method of scanning a surface with a scanning element movable in two dimensions over a surface which comprises deflecting said element in said dimensions by two harmonic forces in time quadrature, and increasing the amplitude of each of said forces systematically with time at different rates to trace a distorted spiral pattern.

10. The method in accordance with claim 9, wherein at least one of said forces is increased at a rate which is nonlinear.

11. The method of scanning the beam of a cathode ray tube over a luminescent display screen which comprises generating a harmonic frequency electrical quantity, modulating said quantity as a linear function of time, remodulating said quantity to produce a nonlinear function of time, deriving quadrature phase components of said quantity, and applying said components to deflect said beam.

12. The method of scanning a surface with a scanning element movable in two dimensions which comprises deflecting said element in two dimensions by two harmonic forces in time quadrature, and additionally deflecting said element by two harmonic forces of double the frequency of said first mentioned forces and also in time quadrature.

13. The method in accordance with claim 12 wherein said first mentioned forces are varied in amplitude linearly with time and said double frequency forces are varied in amplitude nonlinearly with time.

14. A scanning system comprising means for generating equal quadrature components of a harmonic electrical quantity varying linearly with time, means for generating quadrature components of a second electrical quantity of double the frequency of said first quantity and also varying with time, a cathode ray tube, a deflecting system associated with said tube for deflecting a cathode ray therein in two dimensions, and means for applying to said deflecting system in each dimension one quadrature component of each frequency in additive relation.

15. A scanning system in accordance with claim 14 including means for varying the amplitude of said double frequency components in accordance with a nonlinear function of time.

16. A scanning system comprising means for generating two harmonic potentials in time quadrature and varying in amplitude with time, means for generating two additional harmonic potentials of double the frequency of said first mentioned potentials, in time quadrature and varying in amplitude with time, a cathode ray tube provided with two pairs of rectangularly disposed deflecting plates, a summing network connected to each pair of plates, and connections for supplying one potential of each of said frequencies to each of said summing networks.

17. A scanning system in accordance with claim 16 wherein the amplitudes of said potentials vary in accordance with different functions of time.

18. A scanning system in accordance with claim 16 wherein the amplitudes of said first mentioned potentials vary in accordance with a linear function of time and the amplitudes of said double frequency potentials vary in accordance with a nonlinear function of time.

19. The method of scanning a surface with a scanning element movable thereover in two dimensions which comprises deflecting said element thereover in said dimensions by two harmonic forces in time quadrature, and varying said forces in accordance with non-linear functions of time.

20. The method in accordance with claim 19 which comprises the step of varying at least one of said forces in accordance with the sum of a linear and a non-linear function of time.

LU GARDA RIEBER,
*Executrix under the Last Will and Testament of Frank Rieber, Deceased.*

REFERENCES CITED

The following references are of record in the file of this patent:

UNITED STATES PATENTS

| Number | Name | Date |
|---|---|---|
| 2,135,171 | Chireix | Nov. 1, 1938 |
| 2,208,379 | Luck | July 16, 1940 |
| 2,275,974 | Mathes | Mar. 10, 1942 |
| 2,297,126 | Barber | Sept. 29, 1942 |
| 2,312,761 | Hershberger | Mar. 2, 1943 |
| 2,313,966 | Poch | Mar. 16, 1943 |
| 2,412,291 | Schade | Dec. 10, 1946 |
| 2,421,747 | Englehardt | June 10, 1947 |
| 2,426,439 | Dome | Aug. 26, 1947 |
| 2,457,580 | Mayer | Dec. 28, 1948 |
| 2,464,558 | Dammers | Mar. 15, 1949 |